US012811419B2

(12) United States Patent
Zeng et al.

(10) Patent No.: US 12,811,419 B2
(45) Date of Patent: Nov. 24, 2026

(54) OVERVOLTAGE PROTECTION FOR WIRELESS POWER TRANSFER

(71) Applicant: Renesas Electronics America Inc., Milpitas, CA (US)

(72) Inventors: Hulong Zeng, San Jose, CA (US); Eric Tong Lin Huang, San Jose, CA (US); Chan Young Jeong, San Jose, CA (US)

(73) Assignee: Renesas Electronics America Inc., San Jose, CA (US)

( * ) Notice: Subject to any disclaimer, the term of this patent is extended or adjusted under 35 U.S.C. 154(b) by 838 days.

(21) Appl. No.: 18/297,942

(22) Filed: Apr. 10, 2023

(65) Prior Publication Data

US 2024/0339848 A1 Oct. 10, 2024

(51) Int. Cl.
*H02J 7/64* (2026.01)
*H02J 50/10* (2016.01)

(52) U.S. Cl.
CPC ................ *H02J 7/64* (2026.01); *H02J 50/10* (2016.02)

(58) Field of Classification Search
CPC ........................................................ H02J 7/64
USPC ........................................................ 320/108
See application file for complete search history.

(56) References Cited

U.S. PATENT DOCUMENTS

| | | | | |
|---|---|---|---|---|
| 9,998,180 B2 * | 6/2018 | Bakker | G05B 13/0205 |
| 2015/0349538 A1 * | 12/2015 | Agostinelli | H02J 50/12 307/104 |
| 2016/0043562 A1 * | 2/2016 | Lisi | H02J 50/12 307/104 |
| 2016/0254679 A1 * | 9/2016 | Liu | H02J 7/64 307/104 |
| 2020/0373768 A1 * | 11/2020 | Danilovic | H02H 7/22 |

FOREIGN PATENT DOCUMENTS

| | | | |
|---|---|---|---|
| CN | 109742863 A * | 5/2019 | H02J 50/12 |

* cited by examiner

*Primary Examiner* — Jerry D Robbins
(74) *Attorney, Agent, or Firm* — SCULLY, SCOTT, MURPHY & PRESSER, P.C.

(57) ABSTRACT

Systems and methods for wireless power transfer systems are described. A controller of a device can detect an overvoltage condition associated with direct current (DC) power being outputted by a rectifier. The controller can, in response to detection of the overvoltage condition, the controller can control a phase of a current of alternating current (AC) power being received by the rectifier to cause the current and a voltage of the AC power to be out of phase.

20 Claims, 6 Drawing Sheets

100

OVERVOLTAGE PROTECTION FOR WIRELESS POWER TRANSFER

BACKGROUND

The present disclosure relates in general to apparatuses and methods for overvoltage protection for wireless power receiver circuits.

A wireless power system can include a transmitter having a transmission coil and a receiver having a receiver coil. The transmission coil and the receiver coil can be brought close to one another to form a transformer that can facilitate inductive transmission of alternating current (AC) power. The receiver can include a rectifier circuit that can convert the AC power into direct current (DC) power for various loads or components that require DC power to operate.

SUMMARY

In one embodiment, a semiconductor device for wireless power transfer is generally described. The semiconductor device can include a controller and a circuit. The controller can be configured to control a rectifier. The circuit can be configured to detect an overvoltage condition based on an output voltage of the rectifier. The circuit can be configured to, in response to detection of the overvoltage condition, send an indication of the overvoltage condition to the controller. The controller can be further configured to, in response to receipt of the indication, control a phase of a current of an alternating current (AC) power being received by the rectifier to cause the current and a voltage of the AC power to be out of phase.

In one embodiment, an apparatus for wireless power transfer is generally described. The apparatus can include a coil, a rectifier and a controller. The coil can be configured to receive alternating current (AC) power. The rectifier can be configured to convert the AC power into direct current (DC) power. The controller can be configured to detect an overvoltage condition based on a voltage of the DC power. The controller can be further configured to, in response to detection of the overvoltage condition, control a phase of a current of the AC power to cause the current and a voltage of the AC power to be out of phase.

In one embodiment, a method for wireless power transfer is generally described. The method can include detecting an overvoltage condition associated with direct current (DC) power being outputted by a rectifier. The method can further include, in response to detecting the overvoltage condition, controlling a phase of a current of alternating current (AC) power being received by the rectifier to cause the current and a voltage of the AC power to be out of phase.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
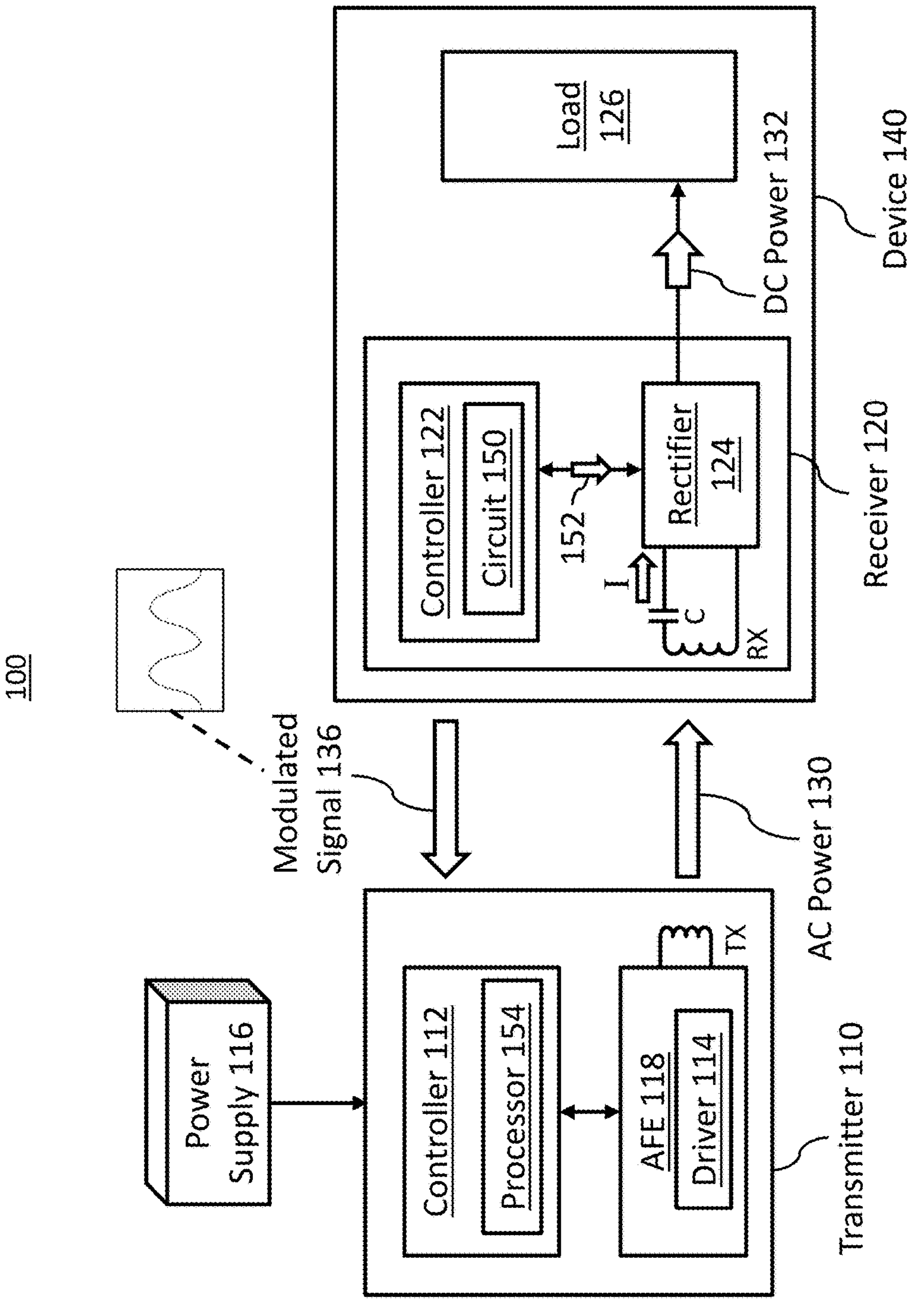
FIG. 1 is a diagram showing an example system that can implement overvoltage protection for wireless power transfer in one embodiment.

FIG. 1 is a diagram showing an example system 100 that implements wireless power transfer and communication according to an illustrative embodiment. System 100 can include a transmitter 110 and a receiver 120 that are configured to wirelessly transfer power and data therebetween via inductive coupling. While described herein as transmitter 110 and receiver 120, each of transmitter 110 and receiver 120 may be configured to both transmit and receive power or data therebetween via inductive coupling.

Transmitter 110 is configured to receive power from one or more power supplies and to transmit AC power 130 to receiver 120 wirelessly. For example, transmitter 110 may be configured for connection to a power supply 116 such as, e.g., an AC power supply or a DC power supply. Transmitter 110 can include a controller 112 and an analog front end (AFE) 118. AFE 118 can include various analog circuitry and integrated circuits (ICs), such as a driver circuit, or driver 114, configured drive a coil TX of transmitter 110.

Controller 112 can be configured to control and operate AFE 118. Controller 112 can include, for example, at least one processor (e.g., a processor 154), central processing unit (CPU), field-programmable gate array (FPGA) or any other circuitry that is configured to control and operate power driver 114. Controller 112 can further include at least one memory devices such as read only memory (ROM), random access memory (RAM), electrically-erasable programmable read only memory (EEPROM), or other types of memory devices. Controller 112 may include any other circuitry that is configured to control and operate various components of operations of transmitter 110. In an example embodiment, controller 112 can be configured to control power driver 114 to drive coil TX of to produce a magnetic field. Power driver 114 can be configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 can be configured to receive AC power 130 transmitted from transmitter 110 and to supply the power to one or more loads 126 or other components of a destination device 140. Load 126 may include, for example, a battery charger that is configured to charge a battery of the destination device 140, a DC-DC converter that is configured to supply power to a processor, a display, or other electronic components of the destination device 140, or any other load of the destination device 140. Destination device 140 may comprise, for example, a computing device, mobile device, mobile telephone, smart device, tablet, wearable device or any other electronic device that is configured to receive power wirelessly. In an illustrative embodiment, destination device 140 can include receiver 120. In other embodiments, receiver 120 may be separated from destination device 140 and connected to destination device 140 via a wire or other component that is configured to provide power to destination device 140.

Receiver 120 can include a controller 122 and a power rectifier 124 ("rectifier 124"). Controller 122 can include, for example, at least one processor, a CPU, an FPGA or any other circuitry that may be configured to control and operate power rectifier 124. Controller 122 can further include at least one memory devices such as ROMs, RAMS, EEPROMs, or other types of memory devices. Power rectifier 124 includes a coil RX and is configured to rectify power received via coil RX into a power type as needed for load 126. Power rectifier 124 is configured to rectify AC power received from coil RX into DC power 132 which may then be supplied to load 126. In one embodiment, power rectifier 124 can be a part of an AFE of receiver 120. Power rectifier 124 can facilitate driving coil RX to transmit signals encoding messages to coil TX of transmitter 110.

As an example, when receiver 120 is placed in proximity to transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126.

Transmitter 110 and receiver 120 are also configured to exchange information or data, e.g., messages, via the inductive coupling of power driver 114 and power rectifier 124. For example, before transmitter 110 begins transferring power to receiver 120, a power contract may be agreed upon and created between receiver 120 and transmitter 110. For example, receiver 120 may send communication packets 136 or other data to transmitter 110 that indicate power transfer information such as, e.g., an amount of power to be transferred to receiver 120, commands to increase, decrease, or maintain a power level of AC power 130, commands to stop a power transfer, or other power transfer information. In another example, in response to receiver 120 being brought in proximity to transmitter 110, e.g., close enough such that a transformer may be formed by coil TX and coil RX to facilitate power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120. For example, if the power contract is already in place. Transmitter 110 and receiver 120 may transmit and receive communication packets, data or other information via the inductive coupling of coil TX and coil RX.

In an aspect, during wireless power transmission from transmitter 110 to receiver 120, movement of transmitter 110 and/or receiver 120 can change a coupling coefficient of the transformer formed by the TX and RX coils. The changes in the coupling coefficient can affect the rectified voltage of DC power 132 being outputted to load 126 by rectifier 124. If the rectified voltage exceeds a voltage require by load 126, an overvoltage condition can occur and this overvoltage condition can damage receiver 120. In an aspect, voltage of the AC power 130 being received can be measured across the coil RX, and the rectified voltage of DC power 132 can vary with voltage of AC power 130.

To address overvoltage conditions, some conventional systems can utilize voltage clamping mechanisms that can include additional circuit components on the receiver or external components to be coupled to the receiver. For example, in some systems, an interface or a pin can be added to the receiver, and a voltage clamp (or switching element) can be added internally in the receiver, or coupled to the receiver externally. The voltage clamp can be connected to the added pin to facilitate discharge of the rectified voltage in response to an overvoltage condition. However, these additional pins and voltage clamps can occupy circuit board space and/or internal silicon area in the receiver and can be expensive. Other solutions for overvoltage protection can include maintaining low-side switches of the receiver's rectifier in an on state, but this may interrupt communications between the transmitter and receiver and may increase current across the low-side switches to a level that may become difficult to regulate.

To be described in more detail below, controller 122 of receiver 120 can be configured to perform overvoltage protection based on a phase shift of a current I of AC power 130. A circuit 150 in controller 122 can be an overvoltage detection circuit configured to detect an overvoltage condition in receiver 120. In response to the detection of the overvoltage condition, circuit 150 can notify controller 122 to use a drive signal 152 to drive switches in rectifier 124 to cause a phase change of I. In one or more embodiments, circuit 150 can be a logic circuit embedded in controller 122, or can be a circuit separated from controller 122. In one embodiment, circuit 150 can be implement as software or a combination of software and hardware.

As controller 122 control a phase of current I, current I and a voltage of AC power 130 can become out of phase. When current I and the voltage of AC power 130 are out of phase, rectifier 124 can be operated as an individual circuit element, such as a capacitor, an inductor, or a voltage source. In one embodiment, controller 122 can control the phase of I to lead a phase of the voltage of AC power 130 by 90-degrees to operate rectifier 124 as a capacitor. When rectifier 124 is operated as a capacitor, no power can flow from an input of rectifier 124 to an output of rectifier 124, thus causing rectified voltage of DC power 132 to stay the same or remain constant to prevent overvoltage condition.

In another embodiment, controller 122 can control the phase of I to lag a phase of the voltage of AC power 130 by −90-degrees to operate rectifier 124 as an inductor. When rectifier 124 is operated as an inductor, no power can flow from an input of rectifier 124 to an output of rectifier 124, thus causing rectified voltage of DC power 132 to stay the same or remain constant to prevent overvoltage condition.

In another embodiment, controller 122 can control the phase of I to cause I and the voltage of AC power 130 to be 180-degrees out of phase to operate rectifier 124 as an AC source voltage. When rectifier 124 is operated as a source voltage, power can flow in a reverse direction from an output of rectifier 124 to an input of rectifier 124, thus causing rectified voltage of DC power 132 to decrease to prevent overvoltage condition.

By using controller 122 to control phase changes of current I, external components may not be needed for overvoltage protection. Further, the phase change performed by controller 122 can prevent additional high circulating current across switches of rectifier 124, thus less difficult to manage. Furthermore, the phase change performed by controller 122 may not require stopping communication between transmitter 110 and receiver 120.

Also, in an aspect, in-band communication of specific wireless power transfer standards (e.g., Qi) can be relatively slow, and transmitter 110 can regulate AC power 130 based on CEP packets provided by receiver 120. The interval between consecutive packets can be within a relatively small range of time, such as 50 to 200 milliseconds (ms). If an overvoltage condition occurs, receiver 120 may need an amount of time that may be more than, for example, 200 ms, or wait until a transmitter timeout, to implement overvoltage protective measures. The phase shift performed by controller 122 can be relatively quick when compared to conventional systems that may need to stop communication between the transmitter and the receiver in order to have additional time to perform overvoltage protection measures.

Figure 2:
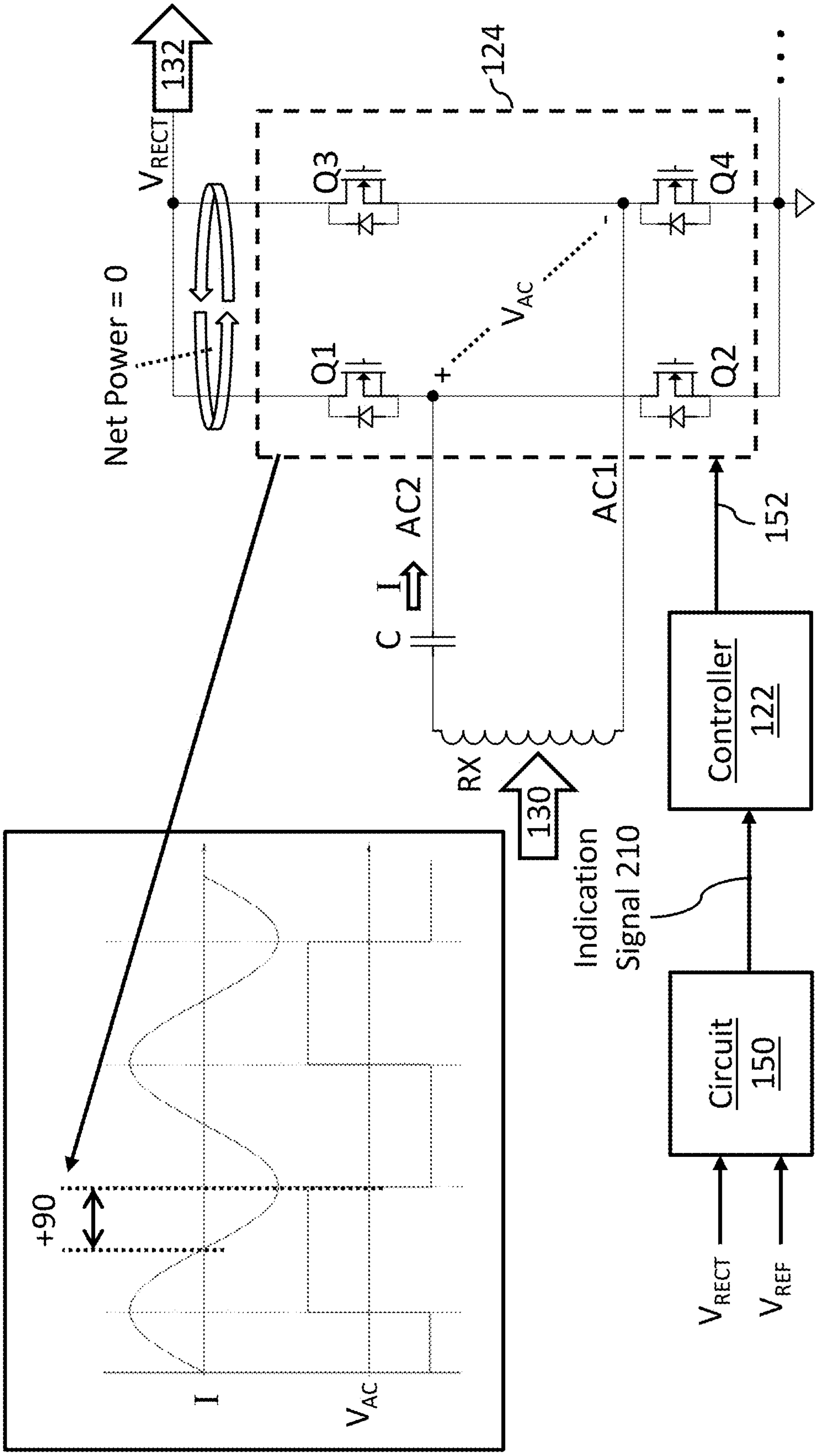
FIG. 2 is a diagram showing an example implementation of overvoltage protection for wireless power transfer in one embodiment.

FIG. 2 is a diagram showing an example implementation of overvoltage protection for wireless power transfer in one embodiment. In an example embodiment shown in FIG. 2, rectifier 124 an include a plurality of switches Q1, Q2, Q3, Q4. Switches Q1, Q2, Q3, Q4 can be implemented by, for example, metal-oxide semiconductor field-effect transistors (MOSFETs). Controller 122 can be configured to use drive signal 152 to drive or switch switches Q1, Q2, Q3, Q4 to different combinations of on/off states to operate rectifier 124. Rectifier 124 can receive AC power 130, convert AC power 130 into DC power 132 and output DC power 132 at an output of rectifier 124. AC power 130 can have the current I and an AC voltage denoted as $V_{AC}$ in FIG. 2, and DC power 132 can have a voltage equivalent to a rectifier voltage denoted as $V_{RECT}$ in FIG. 2.

In one embodiment, circuit 150 can measure $V_{RECT}$ and compare $V_{RECT}$ with a reference voltage $V_{REF}$. $V_{REF}$ can be a predetermined voltage that can be less than a maximum allowed value of $V_{RECT}$. The value of $V_{REF}$ can be based on components in receiver 120, such as resistors and diodes that may affect the maximum allowed value of $V_{RECT}$. In one embodiment, circuit 150 can include a comparator configured to compare $V_{RECT}$ with $V_{REF}$. Circuit 150 can be configured to generate an indication signal 210 that indicates a result of the comparison, such as whether $V_{RECT}$ is less than $V_{REF}$ or greater than or equal to $V_{REF}$. Circuit 150 can send indication signal 210 to controller 122. Controller 122 can receive indication signal 210 and operate rectifier 124 based on indication signal 210. In response to indication signal indicating $V_{RECT}$ is less than $V_{REF}$, controller 122 can operate rectifier 124 under a normal operation mode and a power flow direction can flow from an input of rectifier 124 (e.g., RX coil) to an output of rectifier 124 (e.g., where DC power is being outputted).

In response to indication signal 210 indicating $V_{RECT}$ is greater than or equal to $V_{REF}$, controller 122 can operate rectifier 124 under an overvoltage protection mode. Under the overvoltage protection mode, controller 122 can operate switches Q1, Q2, Q3, Q4 differently from the normal operation mode to perform a phase shift on current I such that current I and AC voltage $V_{AC}$ are out of phase. When current I and AC voltage $V_{AC}$ are out of phase, power flow in rectifier 124 can stop or the power flow direction can be reversed, depending on the amount of phase shift in current I.

In the embodiment shown in FIG. 2, in response to $V_{RECT}$ being greater or equal to $V_{REF}$ under an overvoltage protection mode, controller 122 can operate switches Q1, Q2, Q3, Q4 in rectifier 124 to perform a phase shift of +90 degrees on current I such that the phase of current I is 90-degrees leading a phase of AC voltage $V_{AC}$. When the phase of current I is 90-degrees leading the phase of AC voltage $V_{AC}$, rectifier 124 can operate as a capacitor and a net power in rectifier 124 can be zero (e.g., no power flow). Since there is no power flow towards the output of rectifier 124, $V_{RECT}$ may not continue to increase and the overvoltage condition can be alleviated.

Circuit 150 can continue to monitor $V_{RECT}$ and compare $V_{RECT}$ with $V_{REF}$. In response to $V_{RECT}$ being less than $V_{REF}$, or less than another reference voltage lower than $V_{REF}$ by a predetermined factor, circuit 150 can send indication signal 210 to controller 122. Controller 122 can receive indication signal 210 indicating $V_{RECT}$ is less than $V_{REF}$, and operate switches Q1, Q2, Q3, Q4 of rectifier 124 under the normal operation mode.

Figure 3:
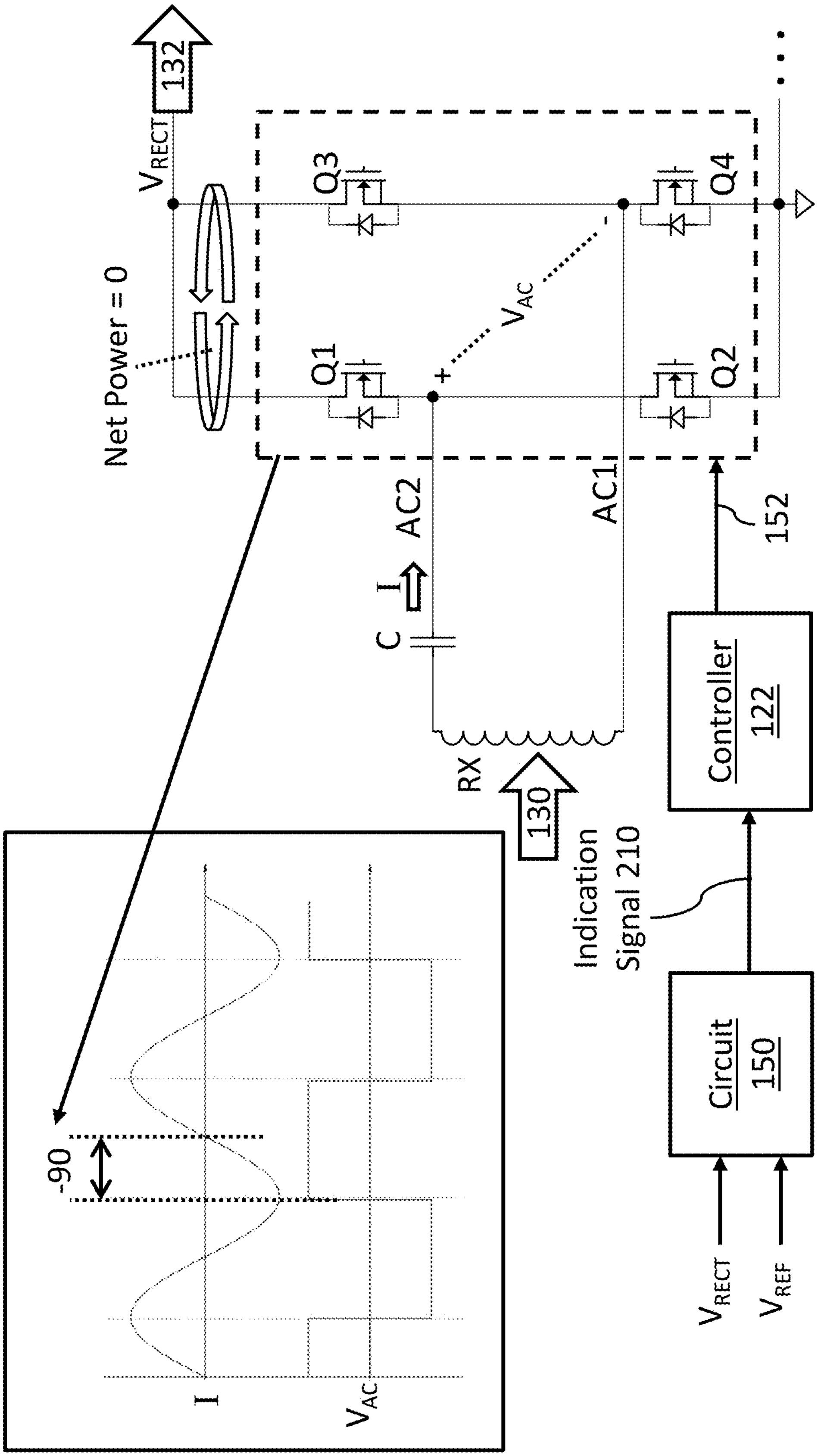
FIG. 3 is a diagram showing another example implementation of overvoltage protection for wireless power transfer in one embodiment.

FIG. 3 is a diagram showing another example implementation of overvoltage protection for wireless power transfer in one embodiment. In the embodiment shown in FIG. 3, In response to indication signal 210 indicating $V_{RECT}$ is greater than or equal to $V_{REF}$ under an overvoltage protection mode, controller 122 can operate switches Q1, Q2, Q3, Q4 in rectifier 124 to perform a phase shift of −90 degrees on current I such that the phase of current I is 90-degrees lagging a phase of AC voltage $V_{AC}$. When the phase of current I is 90-degrees lagging the phase of AC voltage $V_{AC}$, rectifier 124 can operate as an inductor and a net power in rectifier 124 can be zero (e.g., no power flow). Since there is no power flow towards the output of rectifier 124, $V_{RECT}$ may not continue to increase and the overvoltage condition can be alleviated.

In another embodiment, controller 122 can implement a current mode control scheme, in a closed loop after getting the overvoltage indicator from circuit 150, that utilizes current sensed from high-side or low-side switches of rectifier 124. Controller 122 can compare the sensed current with reference current to generate drive signal 152 for driving switches in rectifier 124 to result in phase shift, such as +90 degree phase shift. In another embodiment, controller 122 can implement a voltage mode control scheme, in a closed loop after getting the overvoltage indicator from circuit 150, that utilizes differential voltage measured across capacitor C connected in series with coil RX of receiver 120. Controller 122 can compare the measured differential voltage with a reference of zero voltage to generate gate signals for rectifier 124 resulting in a phase shift, such as −90 degree phase shift. In one embodiment, controller 122 can be configured to detect whether coupling between coils TX and RX is a relatively strong or weak coupling. In response to coils TX and RX having weak coupling, controller 122 can be configured to perform the phase shift of −90 degrees on current I to operate rectifier 124 as an inductor. In response to coils TX and RX having strong coupling, controller 122 can be configured to perform the phase shift of +90 degrees on current I to operate rectifier 124 as a capacitor.

Circuit 150 can continue to monitor $V_{RECT}$ and compare $V_{RECT}$ with $V_{REF}$. In response to $V_{RECT}$ being less than $V_{REF}$, or less than another reference voltage lower than $V_{REF}$ by a predetermined factor, circuit 150 can send indication signal 210 to controller 122. Controller 122 can receive indication signal 210 indicating $V_{RECT}$ is less than $V_{REF}$, and operate switches Q1, Q2, Q3, Q4 of rectifier 124 under the normal operation mode.

Figure 4:
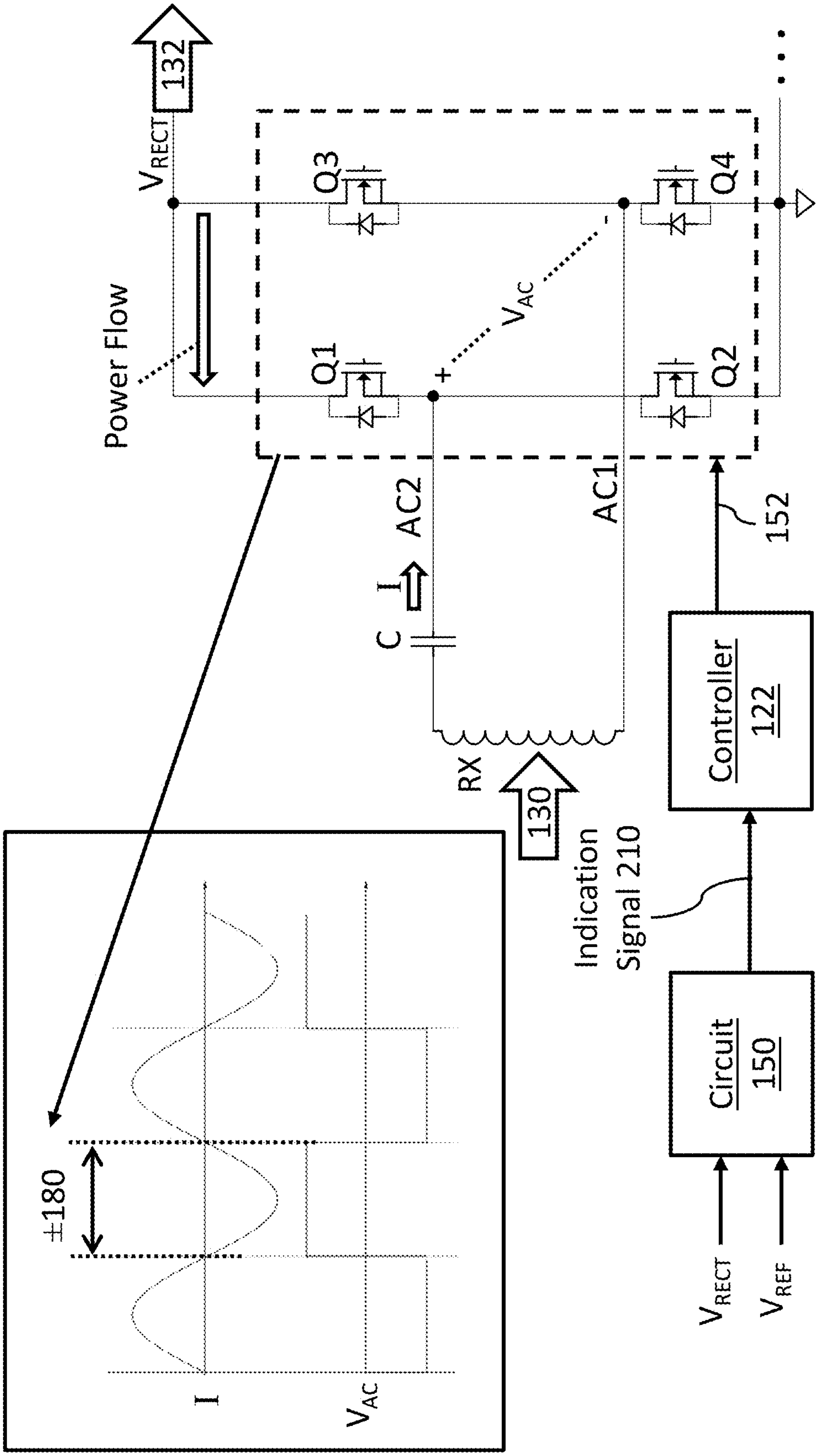
FIG. 4 is a diagram showing another example implementation of overvoltage protection for wireless power transfer in one embodiment.

FIG. 4 is a diagram showing another example implementation of overvoltage protection for wireless power transfer in one embodiment. In the embodiment shown in FIG. 4, In response to indication signal 210 indicating VRECT is greater than or equal to VREF under an overvoltage protection mode, controller 122 can operate switches Q1, Q2, Q3, Q4 in rectifier 124 to perform a phase shift of +180 or −180 degrees on current I such that the phase of current I is 180-degrees leading or lagging a phase of AC voltage VAC. When the current I and AC voltage VAC is 180-degrees out of phase, rectifier 124 can operate as a source voltage and the power flow can be reversed such that power flows from an output of rectifier 124 to an input of rectifier 124. Since power flow is reversed to flow away from the output of rectifier 124, VRECT may decrease and the overvoltage condition can be alleviated.

Circuit 150 can continue to monitor $V_{RECT}$ and compare $V_{RECT}$ with $V_{REF}$. In response to $V_{RECT}$ being less than $V_{REF}$, or less than another reference voltage lower than $V_{REF}$ by a predetermined factor, circuit 150 can send indication signal 210 to controller 122. Controller 122 can receive indication signal 210 indicating $V_{RECT}$ is less than $V_{REF}$, and operate switches Q1, Q2, Q3, Q4 of rectifier 124 under the normal operation mode.

Figure 5:
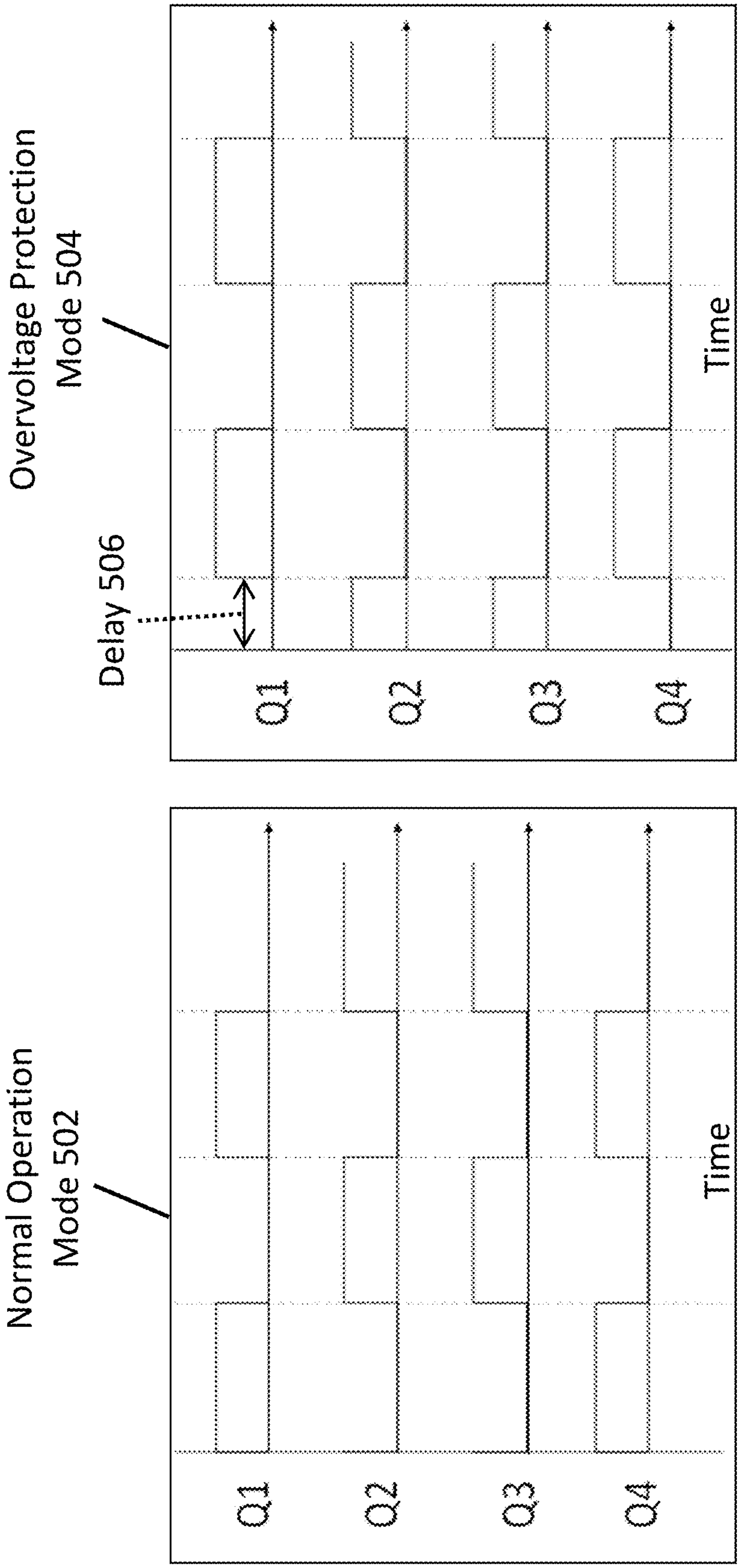
FIG. 5 is a diagram showing states of rectifier switches in an implementation of overvoltage protection for wireless power transfer in one embodiment.

FIG. 5 is a diagram showing states of rectifier switches in an implementation of overvoltage protection for wireless power transfer in one embodiment. In an example embodiment shown in FIG. 5, a comparison of states of switches Q1, Q2, Q3, Q4 of rectifier 124 (in FIG. 1 to FIG. 4) under a normal operation mode 502 and an overvoltage protection mode 504 is shown. Rectifier 124 can operate under normal operation mode 502 when VRECT is less than VREF. Rectifier 124 can operate under overvoltage protection mode 504 when VRECT is greater than or equal than VREF. As shown in FIG. 5, when rectifier 124 operates under overvoltage protection mode 504, controller 122 (see FIG. 1 to FIG. 4) can drive switches Q1, Q2, Q3, Q4 with a delay 506 to perform a phase shift on current I of AC power 130 (see FIG. 1 to FIG. 4) being received by rectifier 124.

Figure 6:
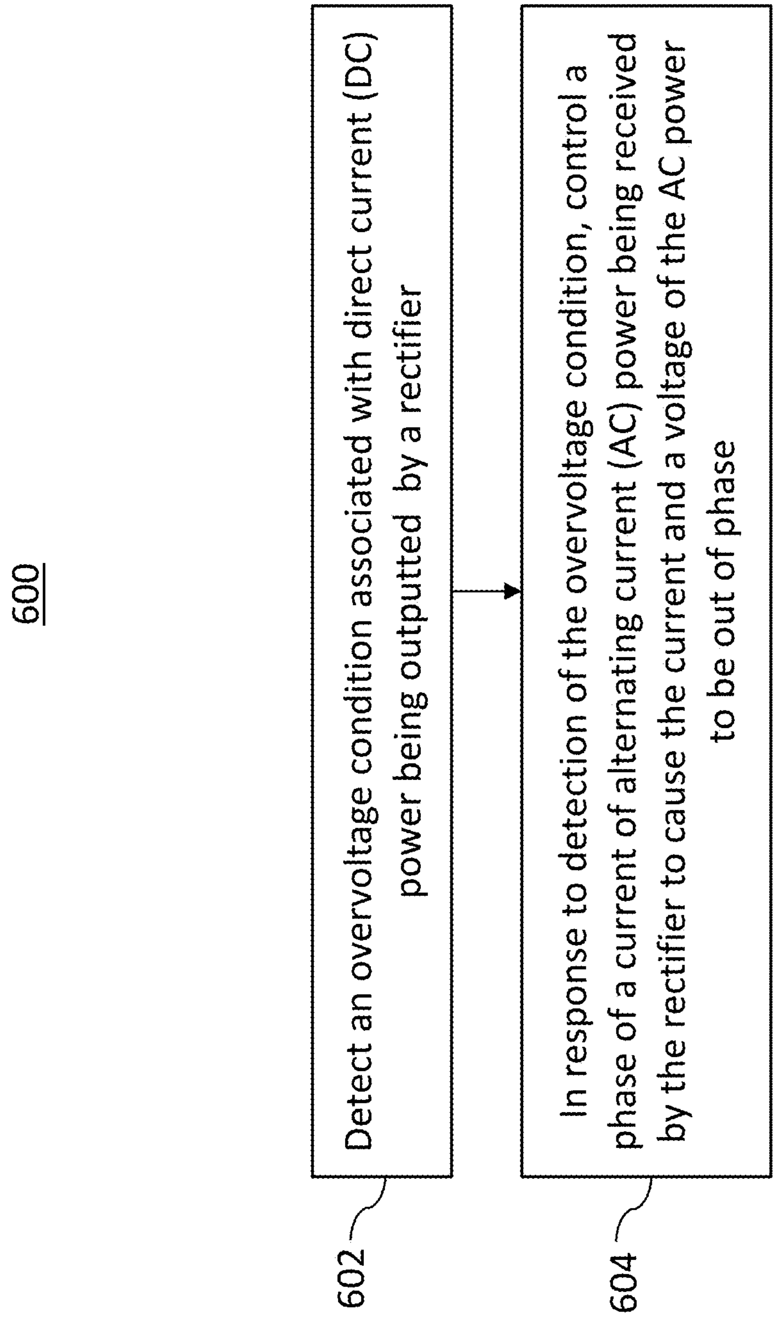
FIG. 6 is a flow diagram illustrating a process of implementing overvoltage protection for wireless power transfer in one embodiment.

FIG. 6 is a flow diagram illustrating a process of implementing overvoltage protection for wireless power transfer in one embodiment. The process 600 may include one or more operations, actions, or functions as illustrated by one or more of blocks 602 and/or 604. Although illustrated as discrete blocks, various blocks can be divided into additional blocks, combined into fewer blocks, eliminated, or performed in parallel, and/or performed in different order, depending on the desired implementation.

Process 600 can be performed by a wireless power receiver in a wireless power transfer system (e.g., receiver 120 in FIG. 1). Process 600 can begin at block 602. At block 602, a controller of the receiver can detect an overvoltage condition associated with direct current (DC) power being outputted by a rectifier.

Process 600 can proceed from block 602 to block 604. At block 604, the controller can, in response to detection of the overvoltage condition, control a phase of a current of alternating current (AC) power being received by the rectifier to cause the current and a voltage of the AC power to be out of phase.

In one embodiment, the controller can control the phase of the current to be 90-degrees leading a phase of the voltage of the AC power. In one embodiment, the controller can control the phase of the current to be 90-degrees lagging a phase of the voltage of the AC power. In one embodiment, the controller can control the phase of the current such that the current is 180-degrees out of phase with the voltage of the AC power.

In one embodiment, in response to the current and the voltage of the AC power being 90-degrees out of phase, the voltage of the DC power remains constant. In one embodiment, in response to the current and the voltage of the AC power being 180-degrees out of phase, the voltage of the DC power decreases.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device for wireless power transfer, comprising:

a controller configured to control a rectifier; and a circuit configured to:

detect an overvoltage condition based on an output voltage of the rectifier; and in response to detection of the overvoltage condition, send an indication of the overvoltage condition to the controller, wherein the controller is further configured to, in response to receipt of the indication, control a phase shift of a current of an alternating current (AC) power being received by the rectifier, wherein the phase shift causes the current of the AC power and a voltage of the AC power to be out of phase by a predetermined angle and the predetermined angle defines whether power flow in the rectifier is stopped or reversed.

2. The semiconductor device of claim 1, wherein the predetermined angle is 90-degrees leading a phase of the voltage of the AC power and power flow in the rectifier is stopped.

3. The semiconductor device of claim 1, wherein predetermined angle is 90-degrees lagging a phase of the voltage of the AC power and power flow in the rectifier is stopped.

4. The semiconductor device of claim 1, wherein predetermined angle is 180-degrees out of phase with the voltage of the AC power and power flow in the rectifier is reversed.

5. The semiconductor device of claim 1, wherein in response to the current of the AC power and the voltage of the AC power being 90-degrees out of phase, the output voltage of the rectifier remains constant.

6. The semiconductor device of claim 1, wherein in response to the current of the AC power and the voltage of the AC power being 180-degrees out of phase, the output voltage of the rectifier decreases.

7. The semiconductor device of claim 1, wherein the rectifier, the controller and the circuit are parts of a wireless power receiver.

8. An apparatus for wireless power transfer comprising:

a coil configured to receive alternating current (AC) power;

a rectifier configured to convert the AC power into direct current (DC) power; and a controller configured to:

detect an overvoltage condition based on a voltage of the DC power; and in response to detection of the overvoltage condition, control a phase shift of a current of the AC power, wherein the phase shift causes the current of the AC power and a voltage of the AC power to be out of phase by a predetermined angle and the predetermined angle defines whether power flow in the rectifier is stopped or reversed.

9. The apparatus of claim 8, wherein the predetermined angle is 90-degrees leading a phase of the voltage of the AC power and power flow in the rectifier is stopped.

10. The apparatus of claim 8, wherein the predetermined angle is 90-degrees lagging a phase of the voltage of the AC power and power flow in the rectifier is stopped.

11. The apparatus of claim 8, wherein the predetermined angle is 180-degrees out of phase with the voltage of the AC power and power flow in the rectifier is reversed.

12. The apparatus of claim 8, wherein in response to the current of the AC power and the voltage of the AC power being 90-degrees out of phase, the voltage of the DC power remains constant.

13. The apparatus of claim 8, wherein in response to the current of the AC power and the voltage of the AC power being 180-degrees out of phase, the voltage of the DC power decreases.

14. The apparatus of claim 8, wherein the coil, the rectifier and the controller are parts of a wireless power receiver.

15. A method for wireless power transfer, the method comprising:

detecting an overvoltage condition associated with direct current (DC) power being outputted by a rectifier; and in response to detecting the overvoltage condition, controlling a phase shift of a current of alternating current (AC) power being received by the rectifier to cause the current of the AC power and a voltage of the AC power to be out of phase by a predetermined angle and the predetermined angle defines whether power flow in the rectifier is stopped or reversed.

16. The method of claim 15, wherein the predetermined angle is 90-degrees leading a phase of the voltage of the AC power and power flow in the rectifier is stopped.

17. The method of claim 15, wherein the predetermined angle is 90-degrees lagging a phase of the voltage of the AC power and power flow in the rectifier is stopped.

18. The method of claim 15, wherein the predetermined angle is 180-degrees out of phase with the voltage of the AC power and power flow in the rectifier is reversed.

19. The method of claim 15, wherein in response to the current of the AC power and the voltage of the AC power being 90-degrees out of phase, the voltage of the DC power remains constant.

20. The method of claim 15, wherein in response to the current of the AC power and the voltage of the AC power being 180-degrees out of phase, the voltage of the DC power decreases.

* * * * *